United States Patent [19]
Saito et al.

[11] Patent Number: 5,268,709
[45] Date of Patent: Dec. 7, 1993

[54] IMAGE FORMING APPARATUS

[75] Inventors: Rie Saito; Yuji Sakemi, both of Yokohama, Japan

[73] Assignee: Canon Kabushiki Kaisha, Tokyo, Japan

[21] Appl. No.: 901,230

[22] Filed: Jun. 19, 1992

[30] Foreign Application Priority Data

Jun. 19, 1991 [JP] Japan .................................. 3-174465

[51] Int. Cl.⁵ .......................................... G01D 15/14
[52] U.S. Cl. .................................. 346/160; 346/157; 430/111
[58] Field of Search ...................... 346/160, 153.1, 157, 346/108; 355/268; 430/100, 111

[56] References Cited

U.S. PATENT DOCUMENTS

| | | | |
|---|---|---|---|
| 4,985,327 | 1/1991 | Sakashita et al. | 430/111 X |
| 4,999,272 | 3/1991 | Tanikawa et al. | 430/111 X |
| 5,009,973 | 4/1991 | Yoshida et al. | 430/111 X |
| 5,115,259 | 5/1992 | Itoh | 346/157 |
| 5,116,711 | 5/1992 | Kobayashi et al. | 430/106 |
| 5,137,796 | 8/1992 | Takiguchi et al. | 430/111 X |
| 5,157,442 | 10/1992 | Tanigawa et al. | 355/251 |

Primary Examiner—R. L. Moses
Attorney, Agent, or Firm—Fitzpatrick, Cella, Harper & Scinto

[57] ABSTRACT

An image forming apparatus, includes a photosensitive member; a light source for producing a beam bearing image information, wherein the beam is projected on the photosensitive member through an imaging optical system to form a scanning spot thereon to form a latent image thereon; developing means for developing with toner the latent image formed on the photosensitive member; wherein not less than 90% by volume of the toner particles satisfy:

$$(\tfrac{1}{2})M < r < (3/2)M,$$

and not less than 99% by volume of the toner particles satisfy:

$$0 < r < 2M,$$

where M is a volume average particle size of the toner, and r is a particle size of the toner particle; and
wherein a recording density of the latent image is higher than 400 dpi, and a size of the spot measured in a movement direction of the scanning spot is not more than a picture element size, and wherein a tone gradation of the image is produced by area gradation on the basis of binary level information per picture element included in the image information.

9 Claims, 8 Drawing Sheets

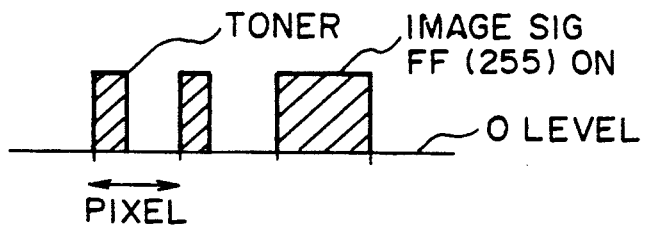
FIG. 7A
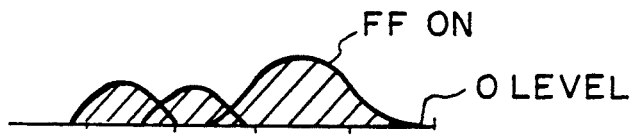
FIG. 7B
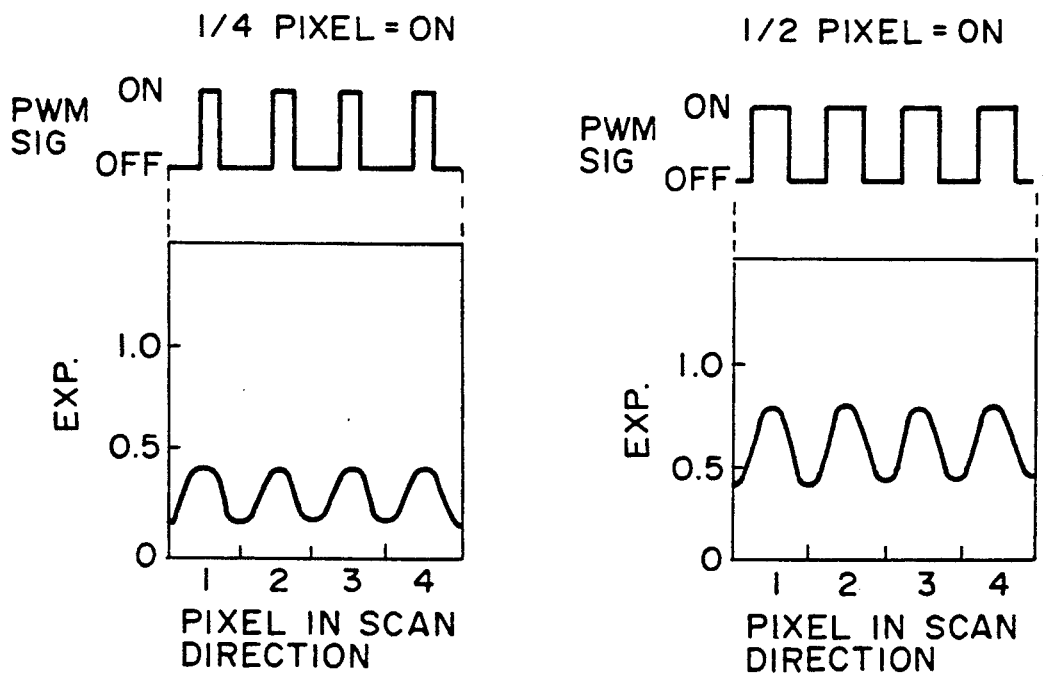
FIG. 8A
FIG. 8B

IMAGE FORMING APPARATUS

FIELD OF THE INVENTION AND RELATED ART

The present invention relates to an electrophotographic digital copying machine, laser beam printer or the like, more particularly to the reproduction of halftone image.

Recent image forming apparatus of an electrophotographic type such as a laser beam printer or the like, uses a PWM (pulse width modulation) type halftone reproduction is used for the purpose of producing high resolution and highly faithful intermediate tone grades. In this system, the halftone image is reproduced by binary level recording while the laser beam is subjected to the pulse width modulation in accordance with the image signal.

Referring first to FIGS. 7A and 7B, there are shown the toner particles on the recording sheet. In FIG. 7A, the toner particles are indicated as having been deposited on the sheet when the ideal tone reproduction through the PWM system is effected. As will be understood, in the ideal PWM system, the thickness of the toner layer does not change irrespective of the image signals, but only the area in the scanning direction changes.

FIGS. 8A and 8B show the exposure amount distribution on the photosensitive medium when the pulse width modulation is effected for ¼ pixel (picture element) and ½ pixel through the PWM system. The recording density is 400 dpi (one pixel has a dimension of 63.5 microns), and the laser beam spot diameter is 70 microns in the main scan direction (Gaussian distribution spot, $1/e^2$).

As will be understood from FIGS. 8A and 8B, the peak of the exposure amount tends to decrease with decrease of the pulse width. For this reason, when the pulse width becomes shorter, the toner layer thickness is decreased actually, as shown in FIG. 7B.

In addition, if the image deterioration factors such as toner scattering during the development, image transfer and sheet conveying operation, are taken into account, the toner layer thickness varies significantly over the entire recording sheet. Since the particle size of the toner is recently decreased, the hightlight portion (extremely low image density portion) and the portion having a tone level less than the halftone level, the thickness of the toner layer is further reduced even to such an extent that the toners are trapped in the fine pits of the recording sheet.

The sizes of the toner particles and the pits of the recording sheet are both in the order of several microns. When the toner layer is formed by many toner particles in the toner layer thickness direction, the pits and projections of the recording sheet are not a problem as will be understood from FIG. 9B. If however, the toner layer consists of one toner particle in the direction of the thickness, as shown in FIG. 9D, some toner particles are out of contact with the fixing roller with the result of remarkable deterioration of the image fixing.

SUMMARY OF THE INVENTION

Accordingly, it is a principal object of the present invention to provide an image forming apparatus in which the image reproducibility in the hightlight or low image density region is improved.

It is another object of the present invention to provide an image forming apparatus in which the toner is completely fixed.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7A and 7B show the toner layer thickness with an ideal PWM process and a toner layer thickness with an actual PWM process.

FIGS. 8A and 8B show exposure distributions on the photosensitive member depending on the pulse width.

DESCRIPTION OF THE PREFERRED EMBODIMENTS

Figure 1:
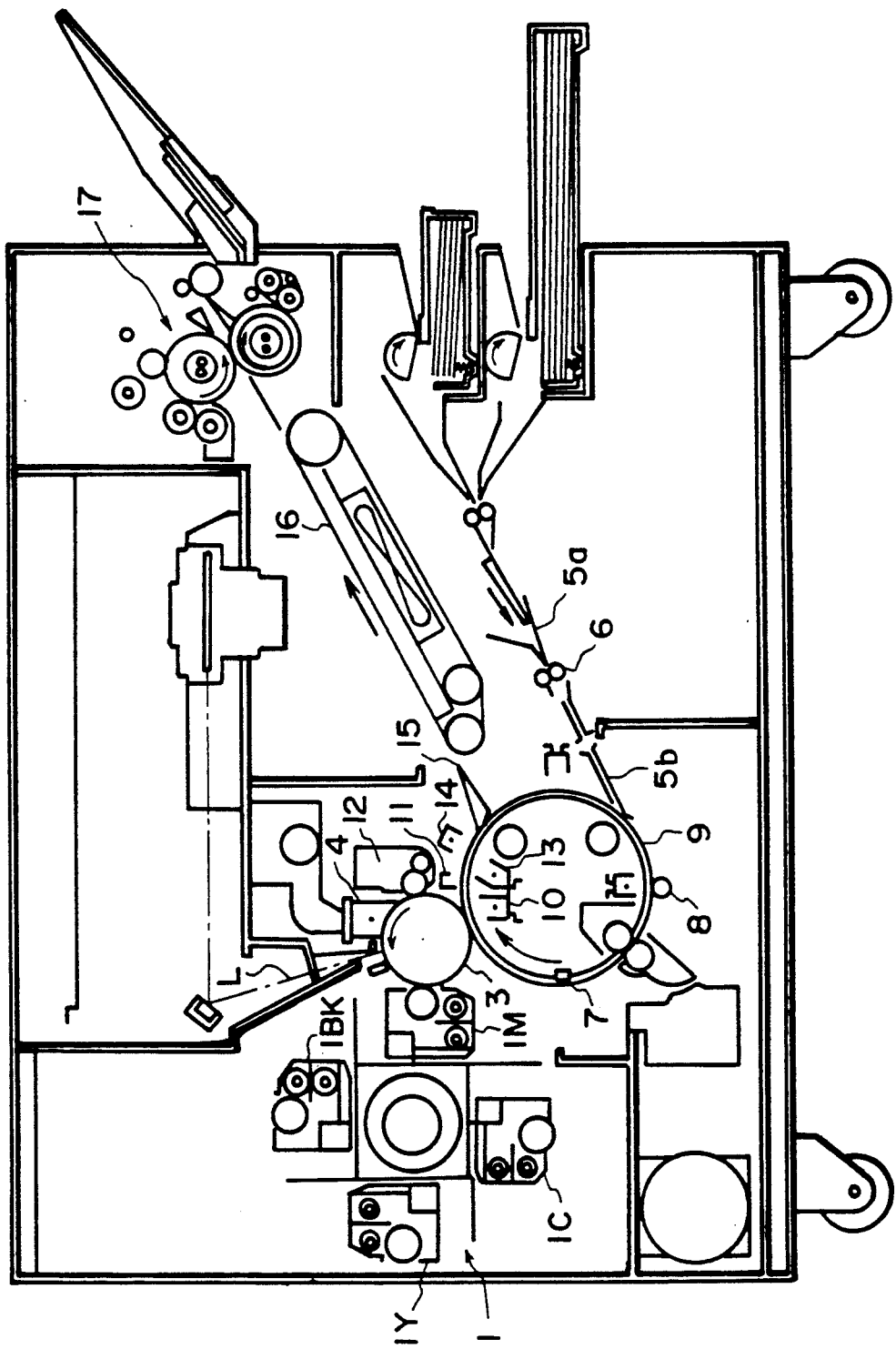
FIG. 1 is a sectional view of an image forming apparatus according to an embodiment of the present invention.

Referring now to FIG. 1, there is shown a general arrangement of an electrophotographic color printer as an exemplary image forming apparatus according to an embodiment of the present invention. It comprises a rotary type developing device including a yellow developing device 1Y, a magenta developing device 1M, a cyan developing device 1C and a black developing device 1BK. It further comprises a photosensitive drum 3 which is rotatable in a direction indicated by an arrow. A photosensitive layer on the drum is uniformly charged by a charger 4. A laser beam scanner emits a laser beam modulated in accordance with magenta image signals of an unshown original, and the photosensitive drum 3 is exposed to the laser beam so that an electrostatic latent image is formed. Thereafter, the latent image is developed by the magenta developing device 1M which has been brought to the developing position through a reverse development process in which the toner is deposited to the portions exposed to the laser beam.

On the other hand, a recording sheet is supplied along a sheet guide 5a, a sheet feeding roller 6 and a sheet guide 5b. It is caught by a gripper 7 at the predetermined timing, and is electrostatically wrapped around a transfer drum 9 by operations of a contacting roller 8 and an opposite electrode therefor. The transfer drum 9 rotates in a direction indicated by an arrow in synchronism with the photosensitive drum 3. The image visualized by the magenta developing device 1M is transferred onto a transfer material at the transfer station by the transfer charger 10. The transfer drum 9 continues to rotate to prepare for receiving the next color (cyan in this example) image. The photosensitive drum 3 is electrically discharged by a discharger 11 and is cleaned by a cleaning member 12. It is charged again by the charger 4 and is exposed to the cyan image signals in the similar manner. In the above operation, the developing device 1 rotates so as to present the cyan developing device 1C the predetermined developing position, so that the image is developed with the cyan developer. The above sequential operations are repeated for the yellow and black colors, so that the four color image transfer operations are completed. Then, the four color developed image on the recording sheet is electrically discharged by dischargers 13 and 14. Then, the gripper 7 is released, and the transfer material is separated from the transfer drum 9 by separation pawls. It is then conveyed on a conveyer belt 16 to a fixing device (heat and pressure roller type fixing device) 17. Thus, a series of full-color printing sequential operations are completed. So that a full-color print is produced.

Figure 2:
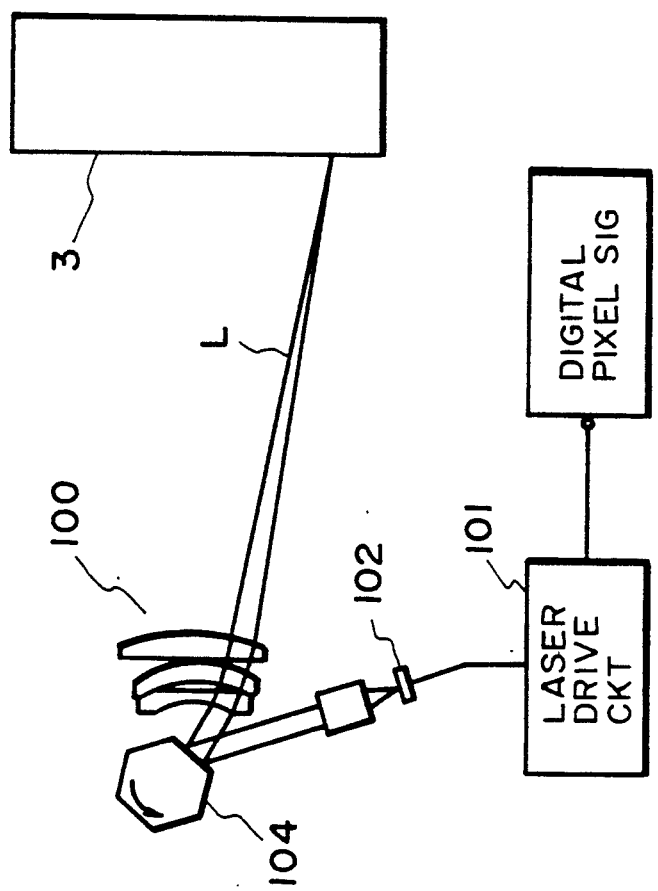
FIG. 2 illustrates a scanning optical system in the apparatus of FIG. 1.

FIG. 2 illustrates a laser beam scanner used in this apparatus. The laser beam scanner comprises a semiconductor laser 102, a polygonal mirror 104 and an f-$\theta$ lens 100. The semiconductor laser 102 receives digital image signals which are supplied from an image reader or a computer which is not shown. In response to the signals, the laser beam is emitted to be projected onto the photosensitive drum surface.

By the scan of the laser beam L on the photosensitive drum surface, an exposure distribution corresponding to one scan is produced thereon. The photosensitive drum 3 is rotated through a predetermined distance for each of the scans, so that a latent image having the exposure distribution corresponding to the image signals is formed on the photosensitive drum 9.

Figure 3:
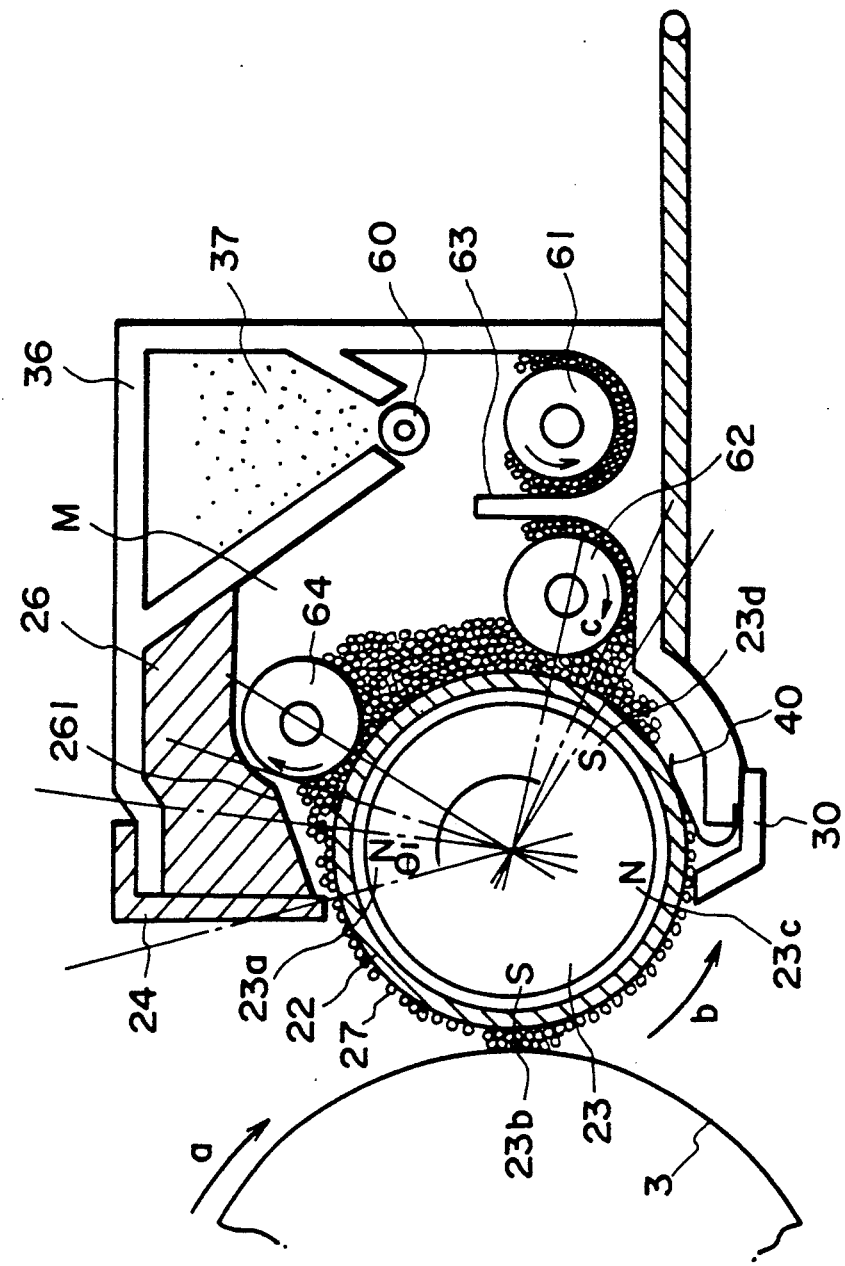
FIG. 3 is a sectional view of a developing device in the apparatus of FIG. 1.

Referring to FIG. 3, there is shown a developing device in an enlarged scale, which is used in the apparatus of FIG. 1. The photosensitive drum 3 is rotated by an unshown driving device in a direction a. A developing sleeve 22 is disposed close to the photosensitive drum 3 and is made of non-magnetic material such as aluminum or SUS 316 (JIS). The developing sleeve 22 is disposed in an elongated opening of a developing device 36 so that substantially a half of the outer periphery of the developing sleeve 22 is in the developer container 36, and that substantially the left half of the periphery thereof is exposed outside the container 36. The developing sleeve 22 is rotatable and is rotated in a direction indicated by an arrow b in operation.

A stationary magnet 23 functions as a fixed magnetic field generating means is stationarily disposed in the developing sleeve 22, so that the magnet 23 does not move even if the developing sleeve 22 is rotated. The magnet 23 has an N pole 23a, an S pole 23b, an L 23c, an S pole 23d. That is, it includes four magnetic poles. The magnet 23 may be in the form of an electromagnet in place of a permanent magnet.

A non-magnetic blade 24 functions as a developer regulating member and is disposed adjacent and along the length of an upper edge of the developer supply opening in which the developing sleeve 22 is disposed. The blade is fixed at its base side on a wall of the container, and the free end thereof is projected toward the inside of the container 36 beyond the upper edge of the opening. The non-magnetic blade 24 may be produced by bending an SUS 316 plate into "L" shape.

A magnetic particle confining member 26 has an upper surface contacted to the bottom surface of the non-magnetic blade 24, and the front end surface functions as a developer guiding surface 261. A developer regulating portion is constituted by the non-magnetic blade 24, magnetic particle limiting member 26 and the like.

In the Figure, reference numerals 27 and 37 designate magnetic particles and non-magnetic toner particles, respectively.

A sealing member is effective to prevent leakage of the toner stagnating at the bottom of the developer container 36. It is elastic and is bent codirectionally with the rotational direction of the developing sleeve 22. The sealing member 40 has an end downstream of the contact area between itself and the developing sleeve 22 to permit the developer entering into the container.

An electrode plate 30 is provided to prevent scattering of the toner by depositing it to the photosensitive drum. The electrode plate 30 is supplied with a voltage having the polarity which is the same as that of the toner to deposit the floating toner produced by the developing action onto the photosensitive drum.

A toner supply roller 60 is operative in accordance with an output of a toner content detecting sensor (not shown). The sensor may be of a volume detecting type, piezoelectric element type, inductance change detection type an antenna type using an AC bias, an optical density detecting type. By the rotation and stoppage of the roller, the non-magnetic toner 37 is supplied. The fresh developer containing the supplied toner particles 37 is stirred and mixed by the screw 61, and during this operation, the supplied toner is triboelectrically charged.

A partition wall 63 is cut away at the opposite longitudinal ends of the developing device. Through the openings provided by the cut away portions, the fresh developer conveyed by the screw 61 is transferred to the screw 62.

The S magnetic pole 23d is a conveying electrode effective to collect the developer after developing operation into the container, and also effective to convey the developer to the regulating portion in the container.

Adjacent the S pole 23d, the fresh developer conveyed by the screw 62 disposed closed to the developing sleeve 22 is replaced with the developer which has been collected after the developing action.

A conveying screw 64 functions to uniform the amount of the developer along the axis of the developing sleeve. The developer conveyed on the developing sleeve 22 in accordance with the rotation of the developing sleeve is conveyed along the axis of the sleeve by the screw 64. The projected portions of the developer layer on the developing sleeve 22 is partly reversed through a space M. The screw 64 is effective to convey the developer in the direction opposite from the direction in which the screw 62 conveys the developer.

The above-described structure is also effective when the developer container contains magnetic particles and non-magnetic or slightly magnetic toner particles.

The distance $d_2$ between an end of the non-magnetic blade 24 and the developing sleeve 22 surface is 50-900 microns, preferably 150-800 microns. If the distance or clearance is smaller than 50 microns, the space may be clogged by the magnetic particles with the result of unevenness of the developer layer, thus preventing proper developer layer formation. If this occurs, the density of the developed image tends to decrease. From the standpoint of preventing the clearance $d_2$ from being clogged with foreign matter or agglomerated toner, it is preferably not less than 400 microns. If it is larger than 900 microns, the amount of the developer applied on the developing sleeve 22 increases with the result of incapability of the developer layer control and with the result of the increase deposition of the magnetic particles to the image bearing member. In addition, the circulation of the developer and the regulation of the developer by the developer regulating member 26 becomes less effective with the result of insufficient triboelectric charge of the toner, which leads to the production of the foggy background.

An angle $\theta 1$ between the magnetic pole N23a and the non-magnetic blade 24 is $-5-35$ degrees, preferably 0-25 degrees. If the angle $\theta 1$ is less than $-5$ degrees, the thin developer layer which is formed by the magnetic force, mirror force and the coagulating force to the developer particles, tends to become uneven. If the angle is larger than 35 degrees, the thickness of the developer layer increases when the blade is a non-magnetic blade, and therefore, it becomes difficult to provide the desired developer layer thickness.

Even when the developing sleeve 22 is rotated in the direction b, the magnetic particle layer motion becomes slower away from the sleeve surface because of the balance between the confining force depending on the magnetic force and the gravity force and the conveying force of the developing sleeve 22. Some part of the magnetic particle layer falls by the gravity.

If the positions of the magnetic poles 23a and 23d and the fluidability and the magnetic properties of the magnetic particles, are properly selected the magnetic particle layer constitutes a movable layer in which the magnetic particles are moved more to the magnetic pole 23a toward the developing sleeve 22. By the motion of the magnetic particles, the rotation of the developing sleeve 22 conveys the magnetic particles and toner particles into the developing zone.

The description will be made as to the reproduction of the halftone images. In this embodiment, a multi-level image processing as in the PWM system to provide the complete area gradation for each of the pixel, is not used. Rather, in the pixel where the laser beam is projected, an area pattern is provided by binary level ouput having a constant laser on-time, so as to produce the tone images (density pattern method or dither method or the like). When a matrix is used including a group of pixels, the high resolution is difficult, and therefore, in this embodiment the recording density is not lower than 400 dpi, for example 600 dpi, rather than 240-400 dpi which is frequently used in the recent laser beam printer or the like. By doing so, the toner layer thickness in each of the pixels given by the development may be a certain constant level, while the high tone reproduction as in the prior art is maintained. Therefore, the insufficient image fixing due to the decreased toner layer thickness can be prevented. When the recording density is 600 dpi, the size of one pixel is approx. $42 \times 42$ microns, and therefore, a small diameter laser spot is required. The desired laser beam spot diameter is investigated. When a fine spot is formed on the photosensitive drum 3 by a laser beam through the optical system shown in FIG. 2 to produce a halftone image, the laser beam spot diameter on the drum which is approx. 1.1-1.6 times the recording pixel size as in the prior art, results in approx. 30% of the contrast between the maximum and the minimum in the exposure amount distribution on the drum even if the laser beam is rendered on and off one another pixels. The difference between the presence and absence of the toner is not clear after the image is developed, and therefore, the tone reproduction is not stabilized.

The inventors' experiments and investigations have revealed that in order to make the potential per pixel more discrete to stabilize the area gradation, the contrast in the exposure amount distribution on the drum when the laser beam L is rendered on and off, is larger than approx. 80%.

Figure 4:
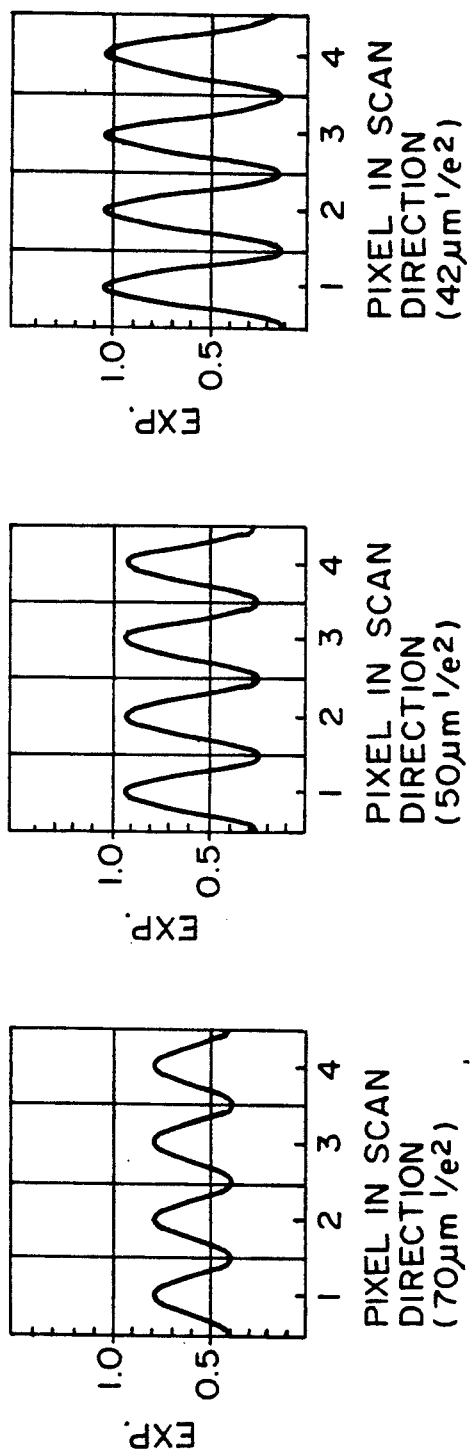
FIGS. 4A, 4B, and 4C show an exposure distribution on a photosensitive member with different laser beam spot diameters.

FIG. 4 shows the exposure distribution on the drum when the recording density is 600 dpi (pixel size of 42.0 microns). FIG. 4A shows the case in which the laser beam spot diameter (Gaussian distribution, $1/e^2$ diameter) is 70 microns which is 1.8 times the pixel size; FIG. 4B shows the case of 50 microns (1.1 times); and FIG. 4C shows the case of 42 microns (1 time).

From FIGS. 4A, 4B and 4C, it will be understood that the contrast of the exposure amount distribution is approx. 30% (FIG. 4A), approx. 60% (FIG. 4B) and approx. 80% (FIG. 4C).

In this embodiment, the spot diameter ($1/e^2$ diameter) of the laser beam is not more than 1 time the pixel size, by which the potential difference between laser on-portion and laser off-portion is made discrete for each of the pixels. In order to faithfully develop a latent image formed by such a laser beam spot, the toner particle size is preferably sufficiently small. Depending on the toner used, the image becomes roughened in the low density hightlight portion (small toner occupying area) after the image transfer and the image fixing, or the development is scattered from the developing device, or the foggy background is produced.

As a result of various experiments and investigations, it has been found that these problems can be solved by properly adjusting the particle size distribution of the toner and/or the volume average particle size of the toner.

The problems are solved in this embodiment by such a toner particle distribution that:

not less than 90% by volume of the toner particles satisfy:

$$(\frac{1}{2})M < r < (3/2)M,$$

and not less than 99% by volume of the toner particles satisfy:

$$0 < r < 2M,$$

where M is a volume average particle size of the toner, and r is a particle size of the toner particle.

In addition, in this embodiment, the volume average particle size is less than 12 microns, preferably not more than 9 microns, and further preferably not more than 8 microns.

The volume distribution and the volume average particle size of the toner are measured in the following manner:

A Coalter Counter TA-II (Coalter Corporation) is used. To the counter, an interface (Nikkaki Kabushiki Kaisha, Japan) outputting a number average distribution and a volume average distribution, and CX-i personal computer (Canon Kabushiki Kaisha, Japan) are connected. Using electrolyte (first class natrium chloride), 1% NaCl water solution is prepared.

To the electrolyte solution (100-150 ml), 0.1-5 ml of surface active agent (dispersing agent) (preferably alkylbenzene sulfonate) is added. Further, 0.5-50 mg of the material to be tested is added thereto.

The electrolyte suspending the material is subjected to the ultrasonic dispersing treatment for approximately 1-3 min. Using an aperture of 100 microns, the particle size distribution in the range of 2-40 microns is measured using the counter TA-II to obtain the volume distribution.

From the volume distribution obtained, the volume average particle size of the material is obtained.

If the toner particle distribution does not satisfy the above, the problems are not solved even if the particle size is changed. When the number of the particles having larger sizes increases, the existence of large size toner particles resulting in the scattering during the image transfer operation cannot be avoided even if the average particle size is reduced. Therefore, it is difficult to reduce the roughness of the image at the low density portion.

If the number of the small size toner particles increase, the toner particles that stick to the magnetic particles increase, with the result of less efficient triboelectric charge application to the toner, and therefore, of the scattering of the toner from the developing device and the foggy background. The small size toner is relatively easily fused on the magnetic particles with the result of the foggy background or the toner scattering due to the deterioration of the carrier particles.

As described above, in this embodiment, the following is satisfied:

1. The recording density is higher than 400 dpi:
2. The toner gradation is provided by area gradation on the basis of binary level output:
3. The laser beam spot size measured in the main scan direction is not larger than the pixel size:
4. Not less than 90% by volume of the toner particles satisfy:

$$(\tfrac{1}{2})M < r < (3/2)M,$$

and not less than 99% by volume of the toner particles satisfy:

$$0 < r < 2M,$$

where M is a volume average particle size of the toner, and r is a particle size of the toner particle.

Because of these features, the tone gradation reproduction is satisfactory in the low image density portion, and the image roughness of the entire image including the low image density portion is significantly reduced, thus accomplishing a high quality full color images. Also, the image fixing is improved.

In order to produce the toner particles having the sharp particle size distribution, as described hereinbefore, the following method is preferable. The material for the toner is melted and kneaded. It is then cooled and pulverized, and the pulverized particles are finely classified. Thereafter, the toner is provided having the desired particle size distribution and/or the volume average particle size.

In order to effect the precise classification, the pulverized powder product may preferably be classified by a fixed-wall type wind-force classifier to obtain a classified powder product, and ultra-fine powder and coarse powder are simultaneously and precisely removed from the classified powder by means of a multi-division classifier utilizing a Coanda effect (e.g., Elbow Jet Classifier available from Nittetsu Kogyo K. K.), thereby to obtain a toner having a prescribed particle size distribution and/or volume-average particle size.

In the present invention, the term "toner" may include colored resin particles (comprising a binder resin and a colorant and another optional additive) per se, and colored resin particles to which an external additive such as hydrophobic colloidal silica has been externally added.

The binder resin used for the toner may for example include: styrene-type copolymers such as styrene-acrylic acid ester resins and styrene-methacrylic acid ester resins; and polyester resins.

In view of color mixing characteristics at the time of fixing, particularly preferred resins may be polyester resins obtained through polycondensation of at least a diol component selected from bisphenol derivatives represented by the formula:

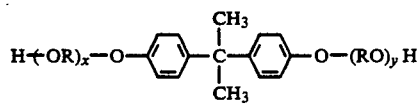

wherein R denotes an ethylene or propylene group; x and y are respectively a positive integer of 1 or more providing the sum (x+y) of 2 to 10 on an average, and their substitution derivatives, and a two- or more-functioned carboxylic acid component or its anhydride or its lower alkyl ester, such as fumaric acid, maleic acid, maleic anhydride, phthalic acid, terephthalic acid and the like. Such polyester resins may show a sharp melting characteristic.

Examples of the colorants suitable for the purpose of the present invention may include the following pigments or dyes. Not recommendables are C.I. Disperse Y164, C.I. solvent Y77 and C.I. Solvent Y93, which exhibit low light stability.

Examples of the dyes may include: C. I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, and C.I. Mordant Blue 7.

Examples of the pigments may include: Naphthol Yellow S, Hansa Yellow G, Permanent Yellow NCG, Permanent Orange GTR, Pyrazolone Orange, Benzidine Orange G, Permanent Red 4R, Watching Red calcium salt, Brilliant Carmine 3B, Fast Violet B, Methyl Violet Laké, Phthalocyanine Blue, Fast Sky Blue, and Indanthrene Blue BC.

Particularly preferred pigments may include disazo yellow pigments, insoluble azo pigments and copper phthalocyanine pigments, and particularly preferred dyes may include basic dyes and oil soluble dyes.

Particularly preferred examples may include: C.I. Pigment Yellow 17, C.I. Pigment Yellow 15, C.I. Pigment Yellow 13, C.I. Pigment Yellow 14, C.I. Pigment Yellow 12, C.I. Pigment Red 5, C.I. Pigment Red 3, C.I. Pigment Red 2, C.I. Pigment Red 6, C.I. Pigment Red 7, C.I. Pigment Blue 15, C.I. Pigment Blue 16, copper phthalocyanine pigments having two or three carboxybenzamidomethyl groups, and copper phthalocyanine pigments.

Particularly preferred examples of dyes may include: C.I. Solvent Red 49, C.I. Solvent Red 52, C.I. Solvent Red 109, C.I. Basic Red 12, C.I. Basic Red 1 and C.I. Basic Red 3B.

As for the content of the colorant, a yellow colorant for providing a yellow toner, which sensitively affects the transparency of an OHP film, may preferably be used in a proportion of not more than 12 wt. parts, more preferably 0.5-7 wt. parts, per 100 wt. parts of the binder resin. A proportion of more than 12 wt. parts results in a poor reproducibility of mixed colored of yellow, such as green, red and skin color.

A magenta colorant and a cyan colorant for providing the magenta and cyan toners, respectively, may preferably be used in a proportion of 15 wt. parts or less, more preferably 0.1-9 wt. parts, per 100 wt. parts of the binder resin.

In case of a black toner contained two or more colorants in combination, the addition of more than 20 wt. parts in total is liable to cause spending thereof to the carrier and cause the colorants to be exposed on the toner surface, thus inviting increased sticking of the toner onto the photosensitive drum to instabilize the fixability. For this reason, the amount of the colorants in the black toner should preferably be 3 to 15 wt. parts per 100 wt. parts of the binder resin.

A preferred combination of colorants for providing a black toner may be that of a disazo type yellow pigment, a monoazo-type red pigment and a copper phthalocyanine-type blue pigment. The proportional ratios of the yellow pigment, the red pigment and the blue pigment may preferably be 1:1.5 to 2.5:0.5 to 1.5.

When the toner used has the negative polarity charging property, it is also preferred to add a charge control agent in order to stabilize the negative chargeability to the toner according to the present invention. In this instance, it is preferred to use a colorless or thin-colored negative charge control agent so as not to affect the color toner of the toner. The magnetic charge control agent may for example be an organo-metal complex such as a metal complex of alkyl-substituted salicylic acid (e.g., chromium complex or zinc complex of di-tertiary-butylsalicylic acid). The negative charge control agent may be added to a toner in a proportion of 0.1 to 10 wt. parts, preferably 0.5 to 8 wt. parts, per 100 wt. parts of the binder resin.

When the developer used in the present invention is a two-component developer comprising a carrier and a toner, the carrier may preferably comprise magnetic particles. The magnetic particles may preferably be those comprising ferrite particles (maximum magnetization: 60 emu/g) which have been coated with a resin so that they have a particle size of 30-100 microns, further preferably 40-80 microns, an electric resistivity of $10^7$ ohm.cm or more, further preferably $10^8$ ohm.cm or more.

The resistivity of the magnetic particles is measured with a sandwiching-type cell having a measuring electrode area of 4 cm$^2$ and having a clearance of 0.4 cm between the electrodes. One of the electrodes is imparted with 1 kg weight, and a voltage E (V/cm) is applied across the electrodes, and the resistivity of the magnetic particles is determined from the current through the circuit.

Figure 5:
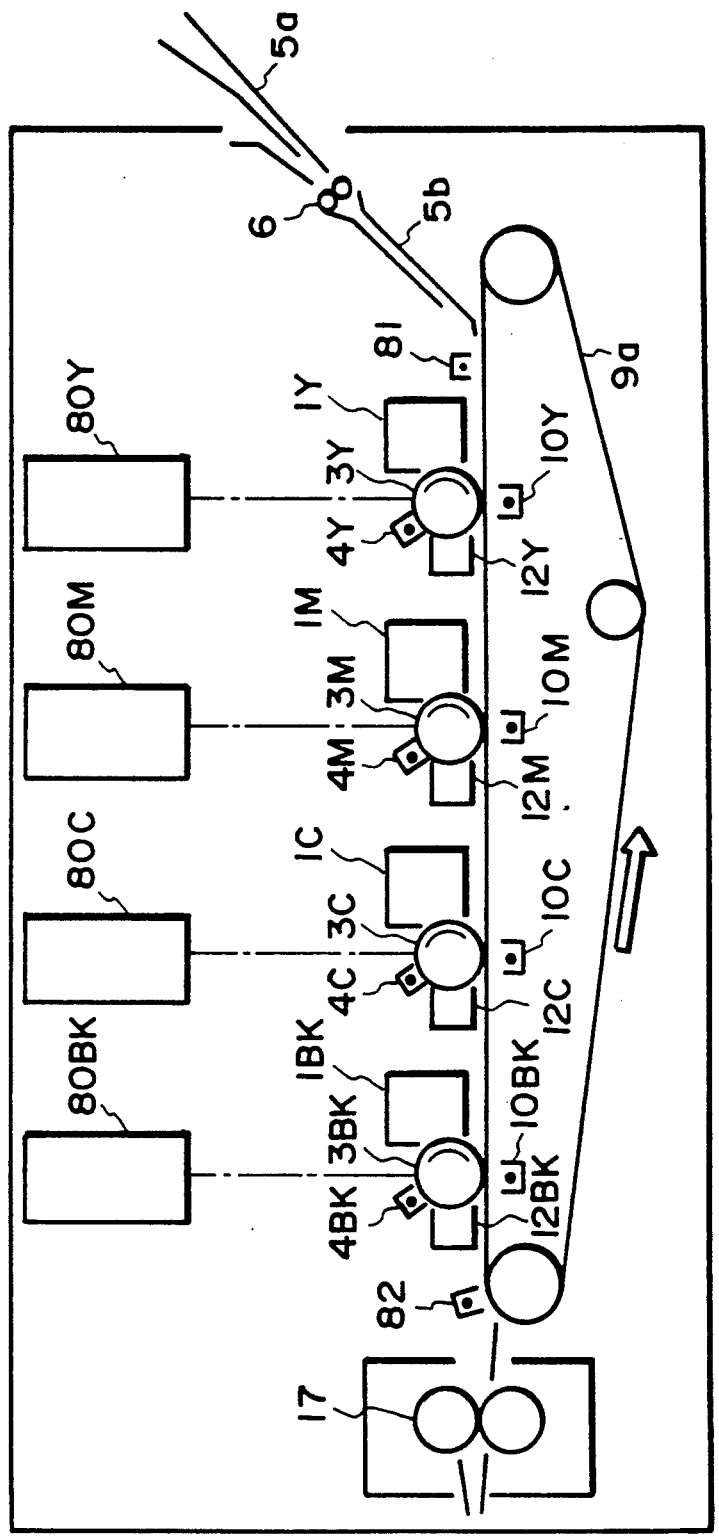
FIG. 5 is a sectional view of an image forming apparatus according to another embodiment of the present invention.

Referring to FIG. 5, another embodiment will be described. The apparatus of this embodiment includes plural photosensitive members 3Y, 3M, 3C and 3BK which are exclusive for yellow, magenta, cyan and black colors, respectively. The photosensitive members are provided therearound with laser beam scanners 80Y, 80M, 80C and 80BK, developing devices 1Y, 1M, 1C and 1BK, image transfer dischargers 10Y, 10M, 10C and 10BK, and cleaning means 12Y, 12M, 12C and 12BK, respectively.

The recording sheet is conveyed along the sheet guides 5a, by the sheet feeding roller 6 and the sheet feeding guide 5b. The sheet is subjected to the corona discharge by an attraction corona discharger so as to be securely held on a conveyer belt 9a. The images are transferred from the photosensitive members onto the sheet by the image transfer dischargers 10Y, 10M, 10C and 10BK. The sheet is then separated from the conveyer belt 9a by a separation discharger 82, and is conveyed to in an image fixed device which fixes the transferred images to fix them into a color image.

In this type of image formation, the precision full color image having good tone gradation in the low image density portion, having less scattered toner and having high precision, by use of the recoring density of 600 dpi, laser beam spot sine in the scanning direction of not more than 42 microns, the developing device of FIG. 3 with the above described developing conditions and with the toner particles having the volume average particle size of less than 12 microns, preferably not more than 9 microns and further preferably not more than 8 microns.

In the foregoing embodiment, the use is made with ferrite particles and AC biased DC bias voltage, but iron powder may be used with a DC bias voltage.

Figure 6:
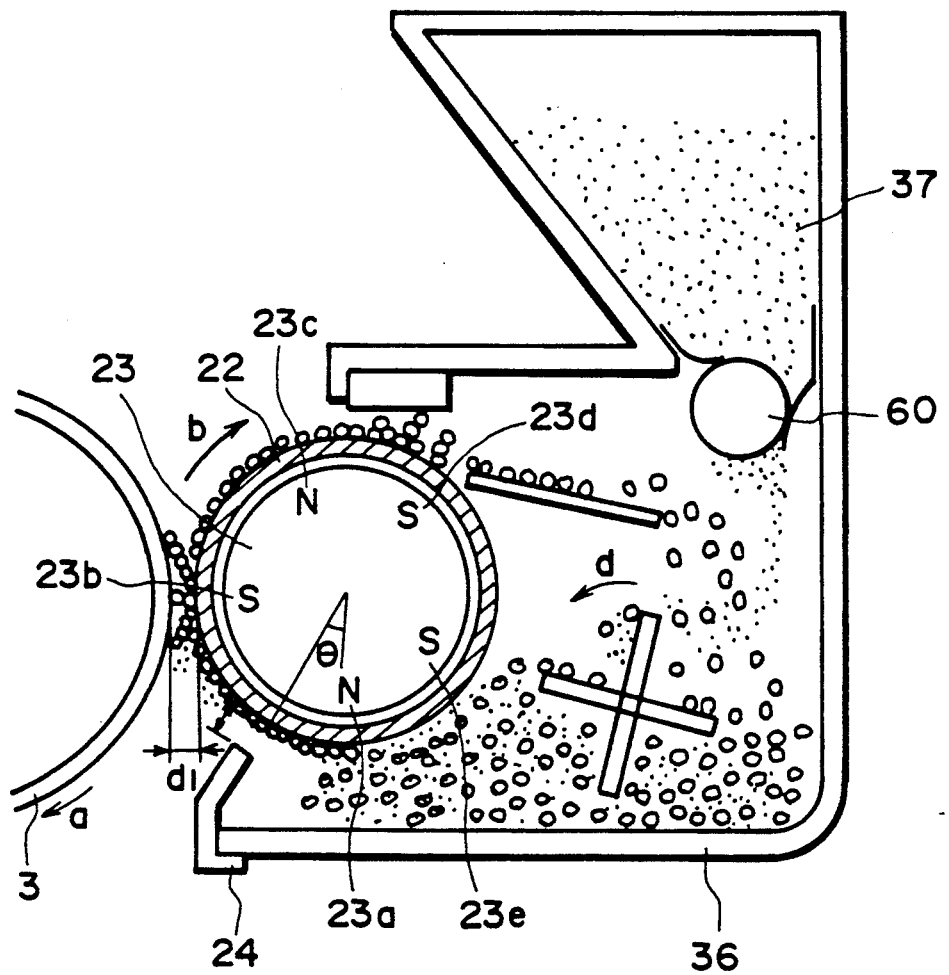
FIG. 6 is a sectional view of another example of the developing device usable with the apparatus of FIG. 5.
Figure 9A:
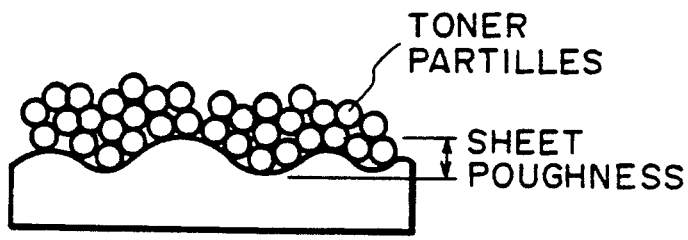
FIGS. 9A, 9B, 9C and 9D show the toner layer thickness on the recording sheet.
Figure 9B:
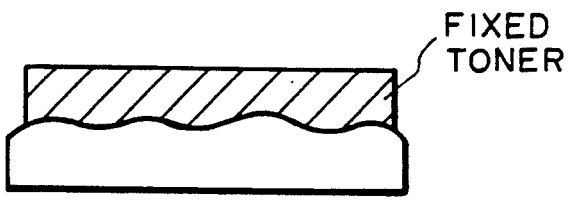
Figure 9C:
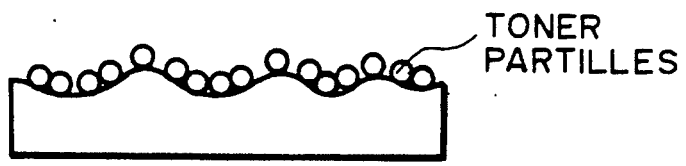
Figure 9D:
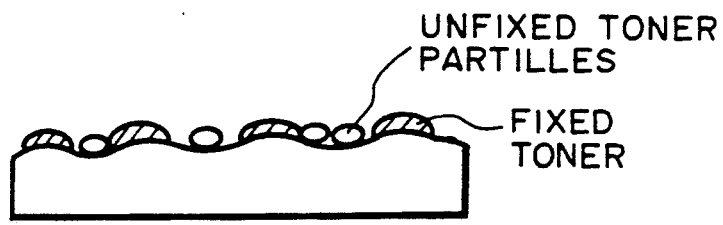

FIG. 6 shows another developing device in which the photosensitive member and the developing sleeve are rotated in the opposite peripheral direction. The same advantageous effects were provided when the used toner had the volume average particle size of 8 microns.

Experimental example will be described:
Polyester resin obtained by condensation of propoxidized bisphenol and fumaric acid (weight-average molecular weight (Mw)=15,000, number-average molecular weight m(Mn)=3,300): 100 wt. parts
Rhodamine pigment: 5 wt. parts
Negative charge control agent (metal complex of di-alkyl-substituted salicylic acid): 4 wt. parts A mixture containing the above ingredients in the prescribed amounts was melt-kneaded. After cooling, the kneaded product was pulverized and the pulverized product was classified by means of a fixed-wall type wind-force classifier and further classified by means of a multi-division classifier utilizing a Coanda effect to obtain negatively chargeable magenta toner having a volume-average particle size of 6 microns.

The thus obtained magenta toner had a sharp particle size distribution such that it contained 95% by volume of particles having a particle size of above 3 microns and below 9 microns, and substantially 100% by volume of particles having a particle size of above 0 microns and below 12 microns.

0.4 wt. part of negatively chargeable hydrophobic colloidal silica was mixed with 100 wt. parts of the above-mentioned magenta toner to prepare a magenta toner containing externally added silica (i.e., external addition product). Then, 6 wt. parts of the magenta toner (external addition product) was mixed with 94 wt. parts of ferrite magnetic particles coated with a styrene-acrylic acid ester copolymer (weight-average particle size: 50 microns, electric resistivity: $10^{10}$ ohm/cm) to prepare a two-component developer for forming a magenta toner image.

By using cyan, yellow and black colorants, a two-component developer for forming a cyan toner image, a two-component developer for forming a yellow toner image; and a two-component developer for forming a black toner image were respectively prepared in the same manner as described above. Table 1 shows the experiment results.

TABLE 1

| | Colorant | Vol. ave. particle size M (μm) | Vol. % of toner particles having particle size > M/2 and < 3M/2 | Vol. % of toner particles having particle size > 0 and < 2M |
|---|---|---|---|---|
| Cyan toner | phthalocyanine pigment | 6 | 95 | 100 |
| Yellow toner | pigment yellow pigment | 6 | 95 | 100 |
| Black toner | mixture of pigment yellow pigment, pigment red pigment and pigment blue pigment | 6 | 95 | 100 |

Each of the two component developers is poured into a polyethylene resin container having a volume of 100 ml, and it is shaked by hands approximately 30 times, and then, triboelectric charge of the toner is measured. The measurements for the respective color toner particles were approximately −30 microcoulomb/g.

The two component developer was supplied to the color image forming apparatus shown in FIG. 1. In the developing device of this embodiment, the clearance $d_2$ between the non-magnetic blade 24 end and the developing sleeve 22 surface was 600 microns, and the clearance $d_1$ between the developing sleeve 22 surface and the photosensitive drum 3 surface was 450 microns.

The photosensitive drum 3 was a laminated type organic photoconductor (OPC), and the latent image portion potential was −600 V.

The bias voltage source 4 provided a rectangular wave AC voltage having a frequency of 1700 Hz and a peak-to-peak voltage of 1500 V biased with −300 V DC voltage.

The original image is separated into color component images, and the photosensitive member is exposed to the magenta component image, cyan component image, yellow component image and black component image in the order named. The semiconductor laser source provided a laser beam having a spot diameter ($1/e^2$ diameter) of 42 microns in the main scan direction, and the $1/e^2$ diameter of 70 microns in the sub-scan direction. The above-described driving pulse width control was effected to control the emitting period. The image was written at the density of 200 lines/inch and with 256 tone gradation. The reverse development and the electrostatic image transfer were repeated sequentially, and finally, the images was fixed by a heating and fixing roller to produce a full-color image. Then, the image was high quality and sufficiently fine with good image fixing and without roughness, wherein the light image density portion (high light portion) was faithfully reproduced.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:
   a photosensitive member;
   a light source including a semiconductor laser device which is supplied with a constant laser driving pulse width in accordance with an image signal and which produces said light source a beam bearing image information, wherein the beam is projected on said photosensitive member through an imaging optical system to form a scanning spot thereon to form a latent image thereon;
   developing means for developing with toner the latent image formed on said photosensitive member;
   wherein not less than 90% by volume of the toner particles satisfy:

$(\frac{1}{2})M < r < (3/2)M,$ and not less than 99% by volume of the toner particles satisfy:

$0 < r < 2M,$ where M is a volume average particle size of the toner, and r is a particle size of the toner particle; and
   wherein a recording density of the latent image is higher than 400 dpi, and a size of the spot measured in a movement direction of the scanning spot is not more than a picture element size, and wherein a tone gradation of the image is produced by area gradation on the basis of binary level information per picture element included in the image information.

2. An apparatus according to claim 1, wherein the recording density is 600 dpi.

3. An apparatus according to claim 1, wherein said developing means reverse-develops the latent image.

4. An apparatus according to claim 1, wherein said developing means includes a developer containing the toner and magnetic particles.

5. An apparatus according to claim 1, wherein the volume average particle size M of the toner is not more than 12 microns.

6. An apparatus according to claim 5, wherein the volume average particle size M of the toner is not more than 9 microns.

7. An apparatus according to claim 6, wherein the volume average particle size M of the toner is not more than 8 microns.

8. An image forming apparatus, comprising:
   a photosensitive member;
   a light source for producing a beam bearing image information, wherein the beam is projected on said photosensitive member through an imaging optical system to form a scanning spot thereon to form a latent image thereon;
   developing means for developing with toner the latent image formed on said photosensitive member;
   wherein not less than 90% by volume of the toner particles satisfy:

$(\frac{1}{2})M < r < (3/2)M,$ and not less than 99% by volume of the toner particles satisfy:

$0 < r < 2M,$ where M is a volume average particle size of the toner, and r is a particle size of the toner particle; and wherein a recording density of the latent image is higher than 400 dpi, and a size of the spot measured in a movement direction of the scanning spot is not more than a picture element size, and wherein a tone gradation of the image is produced by area gradation, which uses a density pattern method, on the basis of binary level information per picture element included in the image information.

9. An image forming apparatus, comprising:
a photosensitive member;
a light source for producing a beam bearing image information, wherein the beam is projected on said photosensitive member through an imaging optical system to form a scanning spot thereon to form a latent image thereon;
developing means for developing with toner the latent image formed on said photosensitive member;
wherein not less than 90% by volume of the toner particles satisfy:

$(\frac{1}{2})M < r < (3/2)M,$ and not less than 99% by volume of the toner particles satisfy:

$0 < r < 2M,$ where M is a volume average particle size of the toner, and r is a particle size of the toner particle; and wherein a recording density of the latent image is higher than 400 dpi, and a size of the spot measured in a movement direction of the scanning spot is not more than a picture element size, and wherein a tone gradation of the image is produced by area gradation, which uses a dither method, on the basis of binary level information per picture element included in the image information.

* * * * *

UNITED STATES PATENT AND TRADEMARK OFFICE
CERTIFICATE OF CORRECTION

PATENT NO. : 5,268,709
DATED : December 7, 1993
INVENTOR(S) : Rie Saito, et al.

It is certified that error appears in the above-identified patent and that said Letters Patent is hereby corrected as shown below:

Column 3, line 52, change "L 23c" to --N pole 23c--.

Column 4, line 25, change "bias, an" to --bias, or an--.

Column 10, line 12, delete "in" and change "fixed" to --fixing--; and
line 18, change "sine" to --size--.

Column 11, line 68, change "said light source a beam" to --a light beam--.

Signed and Sealed this

Thirteenth Day of September, 1994

Attest:

BRUCE LEHMAN

*Attesting Officer*  *Commissioner of Patents and Trademarks*